United States Patent Office 3,373,175
Patented Mar. 12, 1968

3,373,175
CONJUGATION OF VEGETABLE OILS VIA
IRON TRICARBONYL COMPLEX
Edwin N. Frankel, Peoria, Ill., assignor to the United
States of America as represented by the Secretary of
Agriculture
No Drawing. Filed July 9, 1965, Ser. No. 470,938
3 Claims. (Cl. 260—405.6)

ABSTRACT OF THE DISCLOSURE

Conjugation of polyunsaturated vegetable oils or methyl esters thereof with excess iron pentacarbonyl for 2–4 hours at a critical temperature of 185° C. provides markedly improved yields of conjugated fatty iron tricarbonyl complex that is then completely decomposed with $FeCl_3$ to provide an almost fully conjugated drying oil product. At 185° C. the formation of conjugated complex is greatly increased and the reaction need not be interrupted to vent complex inhibiting formations of $CO_2$.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to an improvement in the iron pentacarbonyl catalyzed thermal isomerization of polyunsaturated vegetable oil fatty acids and methyl esters thereof to provide distinctly improved extents of drying oil conjugation via the markedly increased yields of a readily decomposable pi-electron type iron tricarbonyl-fatty complex intermediate.

More particularly, my invention relates to the surprising discovery that greatly improved and substantially theoretical extents of fat conjugation are obtainable when the mixed methyl esters of soybean oil or of linseed oil or the triglyceride per se are heated with excess iron pentacarbonyl at the critical temperature of 185° C. for about 2–4 hours and the resulting stable iron tricarbonyl fatty complex intermediate then decomposed with $FeCl_3$ to liberate the ester or triglyceride, the polyunsaturated fatty acid moieties of which are almost completely in the conjugated form.

A variety of processes are known for conjugating polyunsaturated vegetable oil materials to improve their drying properties. The molecular dehydration of castor oil is, of course, very old. Much more recently Hashimoto et al., Tokyo Kogyo Shikensho Hokoku 57:284 (1962), heated soybean oil in the presence of $Fe(CO)_5$ catalyst at 180° C. and obtained 30 percent of conjugated dienes. Subsequently, Misonou et al., Yukagaku 13:21 (1964), and Ogata et al., ibid 13:308 (1964), subjected already partially conjugated dehydrated castor oil methyl esters and iron pentacarbonyl catalyst to a series of ten 1 hour periods of heating at 180° C., each period being followed by venting to remove reaction-suppressing carbon monoxide. From careful calculation it appears that Ogata et al., by this laborious procedure formed about 69 percent of theory of the castor oil ester-iron tricarbonyl complex which they failed, however, to recognize as a useful intermediate that could be decomposed to quantitatively yield conjugated ester.

An object of the instant invention is an improved process whereby essentially quantitative yields of easily decomposable $Fe(CO)_3$-fatty ester complex are produced without any polymer formation and wherein a major proportion of the small amount of noncomplexed ester or polyunsaturated oil has also been conjugated, apparently as the result of having been transiently complexed with the iron carbonyl prior to reversible partial decomposition of complex by traces of carbon monoxide liberated from the iron pentacarbonyl reagent. Another object is an improved iron pentacarbonyl-catalyzed isomerization process wherein very little if any inhibitory carbon monoxide is formed and successive ventings are not required. Still another object is a process whereby greatly increased yields of pi-electron iron tricarbonyl fatty complexes are obtained, which complexes can either be decomposed to provide an almost quantitative yield of fully conjugated drying oil or it may be used per se as an organometallic coating material. Other objects and advantages will appear hereinafter.

In accordance with the general objects of my invention I have now discovered that essentially quantitative overall extents of fatty acid conjugation, free of polymer formation, are obtainable by reacting a polyunsaturated vegetable oil material such as linseed or soybean oil or their mixed methyl esters with excess iron pentacarbonyl at a critical temperature of 185° C. continuously for at least 2 hours to form in one continuous operation about 90 to 95 percent yields of decomposable conjugated complex.

The major portion of the uncomplexed polyunsaturate fraction becomes conjugated during the reaction so that the whole has excellent drying properties. Moreover, the highly conjugated drying oil material is almost entirely in the high reactive trans, trans-configuration which can be used as the starting material for Diels-Alder adducts and for the preparation of dimer acids.

Whereas the Japanese workers merely noted the formation of a fatty iron carbonyl complex, it apparently did not occur to them to decompose the otherwise stable complex as a source of fully conjugated fatty material. I have found that solutions of ferric chloride cleave the complex quantitatively, thus providing the easily isolated essentially fully conjugated tryglyceride oil or ester.

The following examples are intended to illustrate several preferred embodiments of my invention.

EXAMPLE 1

*Preparation of iron tricarbonyl complex of soybean oil methyl esters*

Soybean oil mixed methyl esters (30.2 g., 0.1 mole, containing 17.1 g. polyunsaturated fatty esters) were charged in a 150-ml. magnetically stirred, high pressure autoclave equipped with sampling tube and cooling coil. To the esters maintained under a nitrogen atmosphere was added 28 ml. iron pentacarbonyl (39.2 g., 0.2 mole). The mixture was thoroughly deaerated by bubbling nitrogen. The autoclave was then sealed and purged three times with nitrogen at a pressure of 100 to 120 p.s.i. with stirring. After releasing the pressure, the autoclave was charged again with 50 p.s.i. nitrogen prior to heating. Complete removal of air before heating was essential to prevent subsequent polymerization of the unsaturated fatty esters and decomposition of the iron pentacarbonyl. The reaction mixture was heated at 185° C. for 2 hours. During the reaction the pressure in the system increased to a maximum of about 200 p.s.i after 0.5 hour and then gradually fell to 130 p.s.i. The reaction was closely observed through successive gas chromatographic analyses. When the content of nonconjugated polyunsaturted fatty esters decreased to a constant value the reaction was considered complete, and the autoclave was cooled to room temperature. The reaction mixture was transferred with petroleum ether (boiling range 39–52° C.) into a round-bottom flask. Unreacted iron pentacarbonyl was removed by water aspirator evacuation in a glass rotating evaporator at 25–60° C. and then at 60–80° C. with a vacuum pump (2–3 mm. Hg) using a Dry Ice trap. The dark oil was redissolved in petroleum ether and treated repeatedly with dilute HCl (2 parts HCl, 1 part water) until the washings were clear. The yellow oil solution was then washed with water to neutrality and dried over $Na_2SO_4$. After removal of solvent, 38.35 g. of iron tricarbonyl-complexed ester product was obtained, containing 22.6 g. of complex and 15.7 g. of extensively conjugated free esters. The product was clear and was colored a deep yellow-orange. The product contained 59.0 percent iron tricarbonyl complex as measured by infrared at 4.88$\mu$ and 5.05$\mu$, using as a reference pure methyl octadecadienoate-iron tricarbonyl complex derived from methyl linoleate. The yield of soybean ester iron tricarbonyl complex based on the infrared analysis was 89.6 percent calculated on the total content of polyunsaturated fatty acids in the starting soybean oil methyl esters.

When the reaction was conducted under precisely the same conditions excepting that the temperature was lowered to 180° C. and even though the reaction time was extended to 4 hours, the yield of iron tricarbonyl complex was only 66.6 percent of theory. Thus, it is apparent that the reaction temperature of 185° C. is indeed critical, since a 5° rise in temperature gives a 35 percent increase in yield of complex. Reaction at temperatures much above 185° C. causes appreciable polymer formation thereby resulting in decreased yields of both complex and conjugated free polyunsaturated fatty acids.

EXAMPLE 2

*Preparation of iron tricarbonyl complex of linseed oil*

Linseed oil (60.25 g., 0.2 mole, containing 37.7 g. of constituent polyunsaturated fatty acids) was reacted with 56 ml. iron pentacarbonyl (78.4 g., 0.4 mole) at 108° C. precisely as described in Example 1 but using a 300 ml. autoclave. The linseed oil-iron tricarbonyl complex product (78.2 g.) contained 52.86 g. of complex which represents the complexing of 95.0 percent of the total polyunsaturated fatty acid content of the starting linseed oil.

When the experiment was carried out under the same conditions excepting that the reaction mixture was heated at 180° C. for 4 hours instead of at 185° C. for 2 hours, the yield of iron tricarbonyl complex obtained was only 36.9 g., i.e., 60.8 percent of theory. In accordance with the prior art the reaction vessel was then cooled to room temperature, vented to remove carbon monoxide and the partially reacted contents reheated for another 2 hours at 180° C. This step resulted in an increase in yield of complex from 60.8 percent to 68.4 percent. Repeating this step once more resulted in a final yield of complex of 83.7 percent. It is obvious, therefore, that at 180° C. it is necessary to successively interrupt the reaction to remove the inhibitory byproduct carbon monoxide in order to somewhat improve the yield of iron tricarbonyl complex. However, even then the yield is appreciably less than that in one step at 185° C. whereby the laborious prior art requirements are obviated and wherein the yield of complex goes to 90–95 percent of theory within 2 hours.

EXAMPLE 3

*Preparation of conjugated soybean oil methyl esters by ferric chloride decomposition of iron tricarbonyl complex*

10.05 g. of the iron tricarbonyl soybean oil methyl ester product of Example 1 containing 5.93 g. of complex was dissolved in 125 ml. 95% ethanol and stirred magnetically while bubbling nitrogen therethrough. Removal of air from the system is essential to prevent polymerization of the unsaturated fatty esters. Small portions of ferric chloride hexahydrate were added to the solution until no more carbon monoxide was evolved. A total of 30 g. of ferric chloride was used. Stirring and nitrogen ebullition at room temperature were carried on for 1 hour. The mixture was then diluted with 125 ml. water and extracted three times with petroleum ether. The iron-free extract was washed with water, dried over $Na_2SO_4$ and the solvent removed. The methyl ester product (7.90 g.) was obtained in 96.7 percent yield (calculation based on the complex concentration in the starting material). This product was analyzed by gas chromatography and found to contain 6.8 percent cis,trans conjugated diene and 48.0 percent trans,trans conjugated diene making a total of 54.8 percent conjugated diene corresponding to 96.6 percent of the total polyunsaturated fatty ester in the original material. Analysis by ultraviolet at 231 m$\mu$ showed a diene conjugated value of 52.6 percent and, at 628 m$\mu$, a triene conjugated value of 3.43 percent. The yield of conjugated acid based on ultraviolet analysis is 98.8 percent based on the total polyunsaturated fatty acids in the original soybean methyl esters.

EXAMPLE 4

*Preparation of conjugated linseed oil by ferric chloride decomposition of iron tricarbonyl complex*

12.02 g. of the linseed oil-iron tricarbonyl product of Example 2 containing 8.12 g. of complex was dissolved in a mixture of 200 ml. benzene and 350 ml. 95% ethyl alcohol. The solution was treated with ferric chloride hexahydrate in the same manner as in Example 3 using a total 60 g. of the ferric salt. Recovery of 9.4 g. of conjugated oil corresponded to a 100 percent yield calculated on the amount of linseed iron tricarbonyl complex in the starting material product. This oil was analyzed by gas chromatography of the corresponding methyl esters and found to contain 2.4 percent cis,trans conjugated diene, 20.0 percent trans,trans conjugated diene, 15.0 percent conjugated dienoic-triene, and 22.8 percent conjugated triene, making a total of 60.2 percent conjugated acids corresponding to 96.1 percent of the total polyunsaturated fatty acids in the original linseed oil. Ultraviolet analyses showed 35.5 percent conjugated diene and 25.1 percent conjugated triene making a total of 60.6 percent conjugated fatty acids or 96.9 percent of the total polyunsaturated fatty acids in the original linseed oil.

I claim:
1. A process for obtaining an improved drying oil by introducing substantially theoretical extents of fatty acid conjugation into a polyunsaturated vegetable oil material selected from the group consisting of linseed oil and soybean oil mixed methyl esters, said process comprising:
  (a) heating a said vegetable oil material with excess iron pentacarbonyl at 185° C. for about 2 hours under a pressurized nitrogen atmosphere to provide an intermediate containing iron tricarbonyl complex equivalent to about 90 percent of the constituent polyunsaturated fatty acids and free partially conjugated vegetable oil material;
  (b) removing unreacted iron pentacarbonyl;
  (c) adding ferric chloride to a nitrogen-blanketed 95% ethanol solution of the complex-containing intermediate to decompose the complex; and
  (d) recovering the highly conjugated polyunsaturated vegetable oil material.
2. The process of claim 1 wherein the vegetable oil material is linseed oil.
3. The process of claim 1 wherein the vegetable oil material is soybean oil mixed methyl esters.

References Cited

J.A.O.C.S., vol. 42(3), pp. 105A, 138A (3/65).
Frankel et al., J.A.O.C.S., vol. 41(3), pp. 186–91 (3/64).
Frankel et al., J.A.O.C.S., vol. 41(5), p. 392 (5/64).
Pettit et al., J. Chem. ed., vol. 40, pp. 175–81 (4/63).

ALEX MAZEL, *Primary Examiner.*

R. J. GALLAGHER, *Assistant Examiner.*